United States Patent
Grow et al.

(10) Patent No.: US 7,016,365 B1
(45) Date of Patent: Mar. 21, 2006

(54) SWITCHING FABRIC INCLUDING A PLURALITY OF CROSSBAR SECTIONS

(75) Inventors: Robert M. Grow, Poway, CA (US);
Fazil I. Osman, Escondido, CA (US);
Vitek Zaba, San Diego, CA (US);
Robert J. Peyser, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,795

(22) Filed: Mar. 31, 2000

(51) Int. Cl.
*H04L 12/56* (2006.01)
*H04L 12/00* (2006.01)

(52) U.S. Cl. .................... 370/413; 370/392; 370/394; 370/395.71; 370/429

(58) Field of Classification Search ........ 370/389, 370/391, 392, 394, 396, 395.71, 412–419, 370/428, 429
See application file for complete search history.

(56) References Cited

U.S. PATENT DOCUMENTS

| | | | |
|---|---|---|---|
| 5,459,724 A | | 10/1995 | Jeffrey |
| 5,550,815 A | * | 8/1996 | Cloonan et al. ............. 370/396 |
| 5,724,352 A | * | 3/1998 | Cloonan et al. ............. 370/388 |
| 5,748,629 A | * | 5/1998 | Caldara et al. .............. 370/389 |
| 6,044,061 A | | 3/2000 | Aybay |
| 6,072,772 A | * | 6/2000 | Charny et al. ............. 370/229 |
| 6,134,218 A | * | 10/2000 | Holden ........................ 370/232 |
| 6,151,301 A | * | 11/2000 | Holden ........................ 370/232 |
| 6,484,209 B1 | * | 11/2002 | Momirov ..................... 709/238 |
| 6,563,837 B1 | * | 5/2003 | Krishna et al. .............. 370/413 |
| 6,629,147 B1 | * | 9/2003 | Grow ........................... 709/236 |
| 6,661,788 B1 | * | 12/2003 | Angle et al. ................. 370/390 |
| 6,680,933 B1 | * | 1/2004 | Cheesman et al. ........... 370/352 |
| 6,707,815 B1 | * | 3/2004 | Suzuki ........................ 370/389 |
| 6,920,146 B1 | * | 7/2005 | Johnson et al. ............. 370/415 |
| 2001/0025332 A1 | * | 9/2001 | Wang et al. ................. 710/132 |

FOREIGN PATENT DOCUMENTS

GB  2244408  11/1991

* cited by examiner

*Primary Examiner*—Hanh Nguyen
*Assistant Examiner*—Ahmed Elallam
(74) *Attorney, Agent, or Firm*—Ted A. Crawford (57) ABSTRACT

A switching fabric for transmitting digital data from a plurality of sources to a plurality of destinations is described. The switching fabric includes a plurality of input ports, a plurality of output ports and a plurality of switching sections. Each of the input ports receives data frames and partitions the received data payload of at least some of the frames into a plurality of associated data cells. Each of the output ports are coupled to at least one destination associated with the headers of the data frames. Each of the switching sections may be coupled to each of the input ports and each of the output ports for transmitting each of selected ones of the data cells from the at least one input port to one or more of the coupled output ports.

23 Claims, 8 Drawing Sheets

SWITCHING FABRIC INCLUDING A PLURALITY OF CROSSBAR SECTIONS

BACKGROUND

1. Field of the Invention

Embodiments described herein are directed to data networks. In particular, embodiments described herein relate to transmitting data from several data sources to several destinations.

2. Related Art

The increased speed and volume of random access memories (RAM) between nodes in data communication networks have potentially increased the speed at which local area networks (LANs) and wide area networks (WANs) transmit data between two given points in a network. These networks typically include switches or bridges having one or more input ports for receiving packetized data from sources, and one or more output ports for transmitting data received at the input ports to physical destinations in the network.

Data switches typically employ switching fabrics which couple the input ports to the output ports. Data frames received at the input ports are typically temporarily stored in RAM at the switching fabric before being transmitted to the output port associated with a desired a destination. In large capacity switches, data frames are typically received at input ports at an aggregate rate faster than the ability of the switching fabric to write to and read from a shared RAM. The differences between the media speed and the memory speed can be accommodated by increasing the widths of the words being written to and read from memory. Here, even though media speeds increase, the width of the memories may be increased to accommodate these increases in the media speed. However, benefits of increasing memory width diminishes as memory width surpasses a minimum frame length of the ports (e.g., 64-bytes for an Ethernet frame). Accordingly, there is a need for a new switching fabric architecture to allow a data switch to support increases in media speed in transmitting data between two points in the network, and to enable switches with a large number of media connections.

To address the problem of RAM throughput limitations, data switches have employed multiple memories interconnected with a means for transmitting data from an input RAM to an output port or an output port RAM. When this transfer of data from an input RAM are scheduled using a single queue, "head-of-line blocking" condition typically arises in which data is prevented from moving through a switch to an idle output port because it must wait in the queue behind data waiting for a busy output port to become idle. There is, therefore, also a need for a switching fabric architecture which reduces the incidence of head-of-line blocking.

Data switches have typically employed crossbars for interconnecting multiple ports where each input port is coupled to any of the output ports. Integrated circuit implementations of such crossbar circuitry are typically designed for a set number of ports. Current crossbar architectures typically require a geometric increase in the number of integrated circuits to increase the number input ports beyond the size of a single crossbar chip. Accordingly, there is a need for a switching fabric architecture which can be scaled to incorporate additional numbers of input and output ports without a corresponding geometric increase in a number of integrated circuits required for transmitting data frames from the input ports to the output ports.

DETAILED DESCRIPTION

Embodiments of the present invention are directed to a switching fabric for transmitting data between a plurality of input ports to a plurality of output ports through a plurality of switching sections. Each switching section is coupled to receive data from each of the input ports and coupled to transmit the received data to any of the output ports. The input ports partition the received data frames into data cells to be individually addressed and transmitted to an available switching section. The switching sections then transmit the received cells to the output port corresponding with the destination of the frame. The receiving output port then reassembles the frame received at the input port from the received cells before enqueing the frame to a destination media access control (MAC) output.

Figure 1:
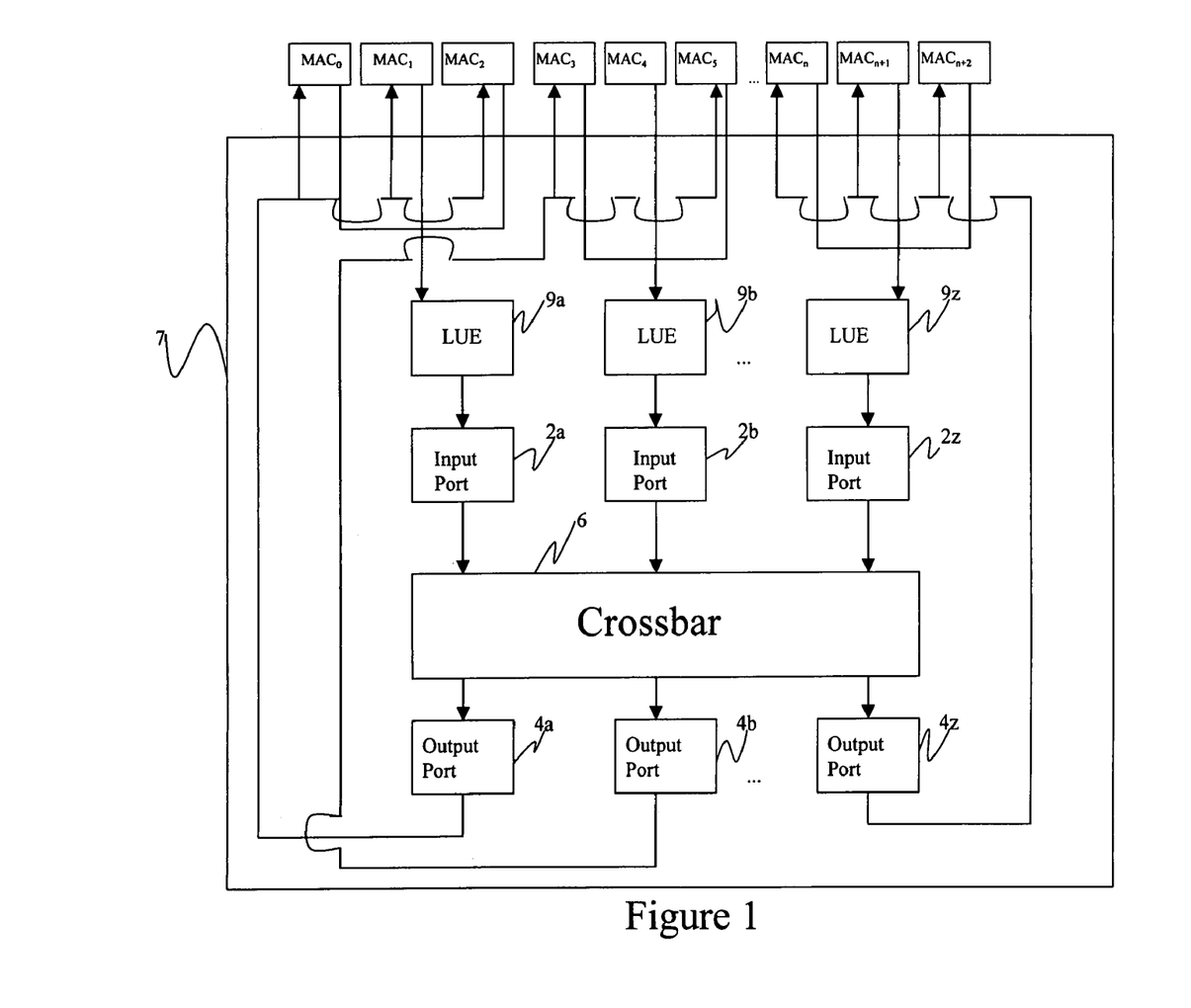
FIG. 1 shows the topology of a data switch employing a switching fabric according to an embodiment of the present invention.

FIG. 1 shows a data switch 7 for transmitting data packets between MAC devices $MAC_0$ through $MAC_{n+2}$. Each MAC device is associated with an input port 2 and an output port 4. Each MAC device receives data packets having a destination associated with one of the other MAC devices. The MAC devices forward data frames (based upon the received data packets) to a corresponding input port 2. The input port 2 then transmits the data frames through a crossbar 6 to an output port 4 corresponding with the MAC device associated with the destination of the data frame.

Prior to receipt of data frames at the input ports 2, the data frames are initially processed at a corresponding look up engine (LUE) 9. Each data frame received at an LUE 9 from a source MAC device includes destination information corresponding with one or more of the other MAC devices. The LUE 9 associates this destination information with an output port 4, and provides information identifying the output port 4 in an intermediate data frame to be transmitted to the input port 2 coupled to the LUE 9. Based upon the information in the intermediate data frame identifying the output port 4, the input port 2 may then initiate the transmission of the intermediate data frame through the crossbar 6 to the output port 4 associated with the destination of the data frame received at the LUE 9.

Figure 2:
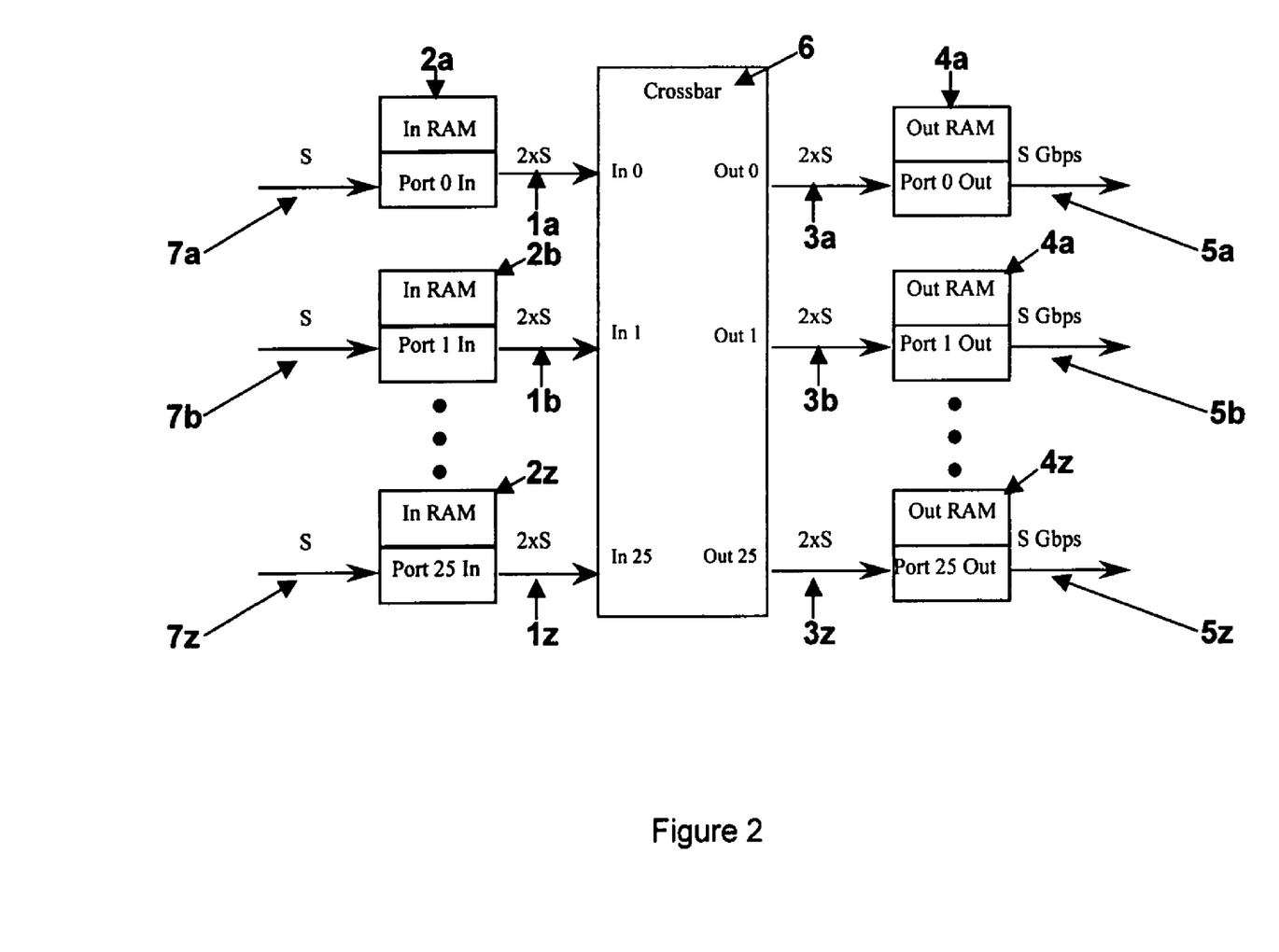
FIG. 2 shows a schematic drawing illustrating a switching fabric according to an embodiment of the switching fabrics illustrated in FIG. 1.

In the embodiment of FIG. 2, each of the input ports receives data at a rate S (e.g., 8.0 Gbps) from data paths 1a–1z and transmits data to the crossbar 6 at a rate of two times S (e.g., 16.0 Gbps). Buffering at the crossbar 6 using RAM in combination with the increased rate of transmission between the input ports and the crossbar 6 enables frames to be forwarded to the output ports 4 at a rate greater than the media speed (i.e., the data rate at which data frames are received at the input ports 2). The data is forwarded from the output ports 4 via data paths 5a–5z.

Figure 3:
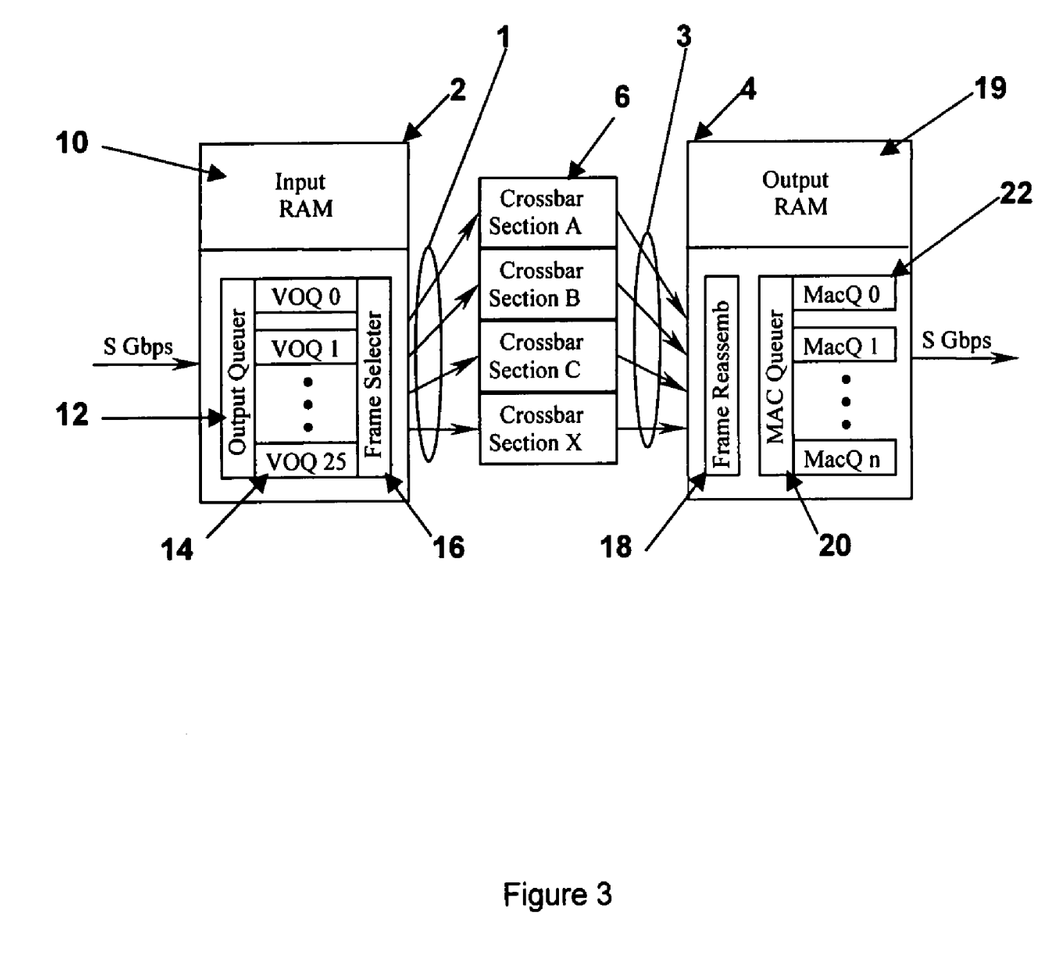
FIG. 3 illustrates the components of a single input port and a single output port coupled by sections of a crossbar according to the embodiment of the switching fabric of FIG. 2.

FIG. 3 shows an embodiment of input port 2 and output port 4 in the switching fabric of FIG. 2. A corresponding LUE 9 (FIG. 1) determines the destination output ports 4 for each data frame received at an input port 2 and identifies the output port 4 in the header of the data frame received at the input port 2. Each input port 2 includes an input RAM 10, an output queuer 12, at least one virtual output queue 14, and a frame selector 16. Each input port 2 maintains the at least one virtual output queue (VOQ) 14 in a RAM buffer for each output port 4. The size of the RAM buffer may be selected based upon the input media speed relative to the aggregate data rate from an input port 2 to the crossbar 6.

A frame selector 16 selects frames to be forwarded across the crossbar 6 to the output ports 4. To provide for efficient forwarding of the frames, the frame selector 16 partitions the data payload of the received data frame and appends each partition to header information to provide a data cell 51 as shown in FIG. 4b. The input ports 2 communicate with sections 100 of the crossbar 6 to manage output congestion at each crossbar section as illustrated with reference to FIGS. 5 and 6. Such output congestion can occur if a data cell cannot be forwarded to an output port 4 because of an unavailability of locations in output queues 102 of a crossbar section 100.

Figure 5:
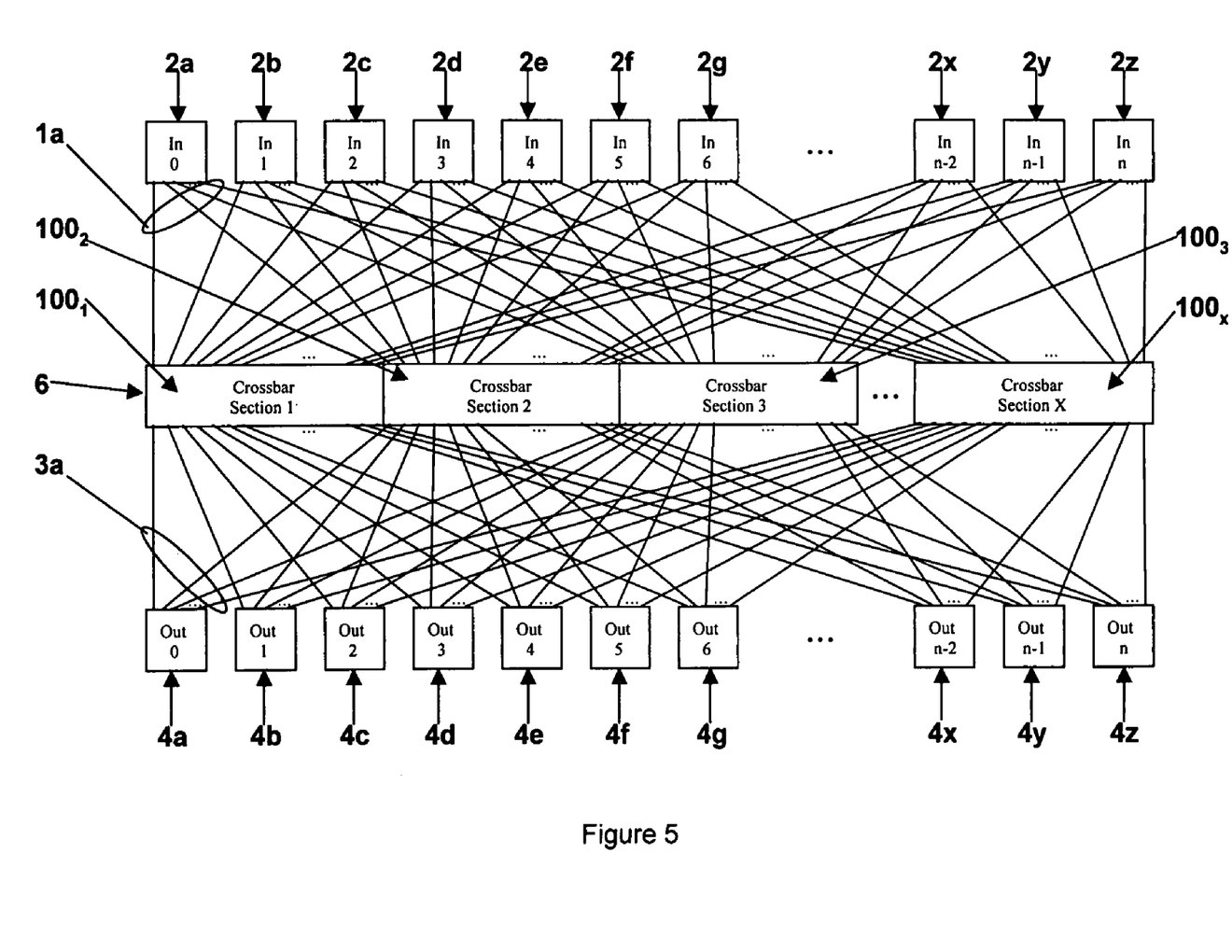
FIG. 5 shows a switching fabric topology illustrating an interconnection of each crossbar section with each input port and output port of the switching fabric illustrated in FIG. 2.

FIG. 3 shows the crossbar 6 as including four crossbar sections. In other embodiments, the crossbar 6 may include fewer or more sections, each section being coupled to receive data from any one of the input ports 2 and transmit data to any one of the output ports 4 as shown in FIG. 5. According to an embodiment, the aggregate data rate on links 1 between an input port 2 and a section of the crossbar 6 is twice that of the rate of data being received at the input port 2. This mesh of links, transmitting data from the input ports 2 to the crossbar sections at a rate twice that at which data is received at the input ports, relieves output port congestion and reduces the incidence of head of line blocking.

Each output port 4 includes an output RAM 19 and an ASIC portion. The ASIC portion includes a frame reassembler 18 and a MAC queuer 20 for maintaining a frame transmit queue for each MAC device associated with the output port 4. Logic at the output 4 indicates the availability of buffer space for the receipt of additional cells from the crossbar 6. Data cells from the crossbar 6 are placed in proper sequence within the output RAM 19 to reconstruct frames. When frames are reassembled and buffered within the output RAM 19, the output MAC queuer 20 can place a frame into an appropriate queue associated with the destination MAC address.

According to IEEE standard 802.1 frame order must be maintained within a context associated with a specific network address. According to an embodiment, a frame is not enqueued in a MAC queue 22 until all frames required to be transmitted first (to maintain frame order) are enqueued. This can be implemented by ordering data cells received at the output port 4 according to the sequence number 56 in a field of the data cells illustrated in FIGS. 4a and 4b discussed below. A frame is enqueued in a MAC queue 22 upon receipt of all data cells for the frame as indicated by an unbroken sequence of sequence numbers 56 for the received sequence numbers 56 of the received data cells, provided that no cells of an earlier sequence number 56 of a partially received data frame have been received. Other methods for monitoring the integrity of the data frames may be used as known to those of ordinary skill in the art.

Figure 4A:
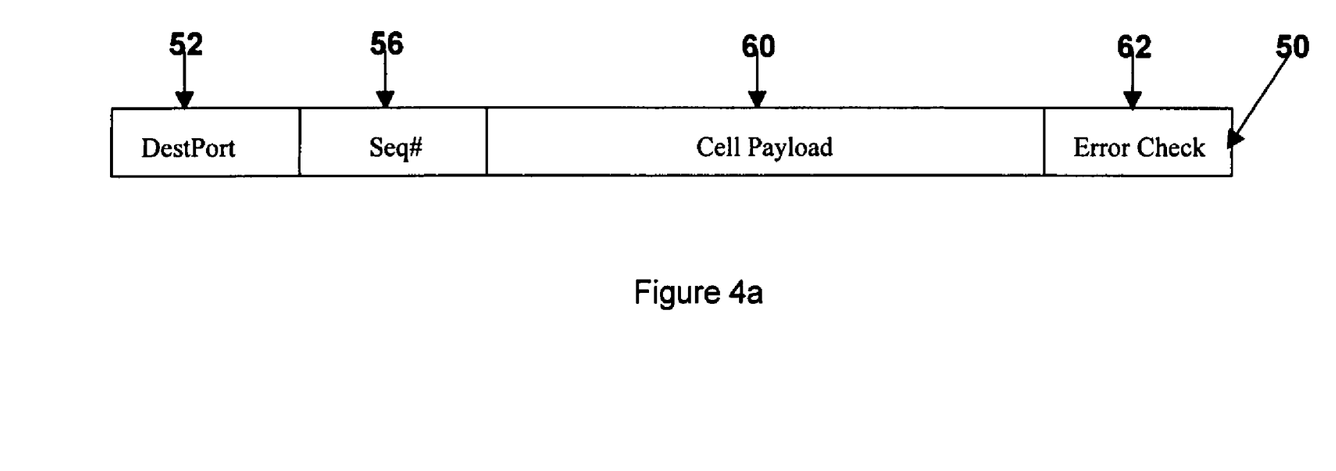
FIGS. 4a and 4b show the composition of a data cell according to the embodiment of FIG. 3.
Figure 4B:
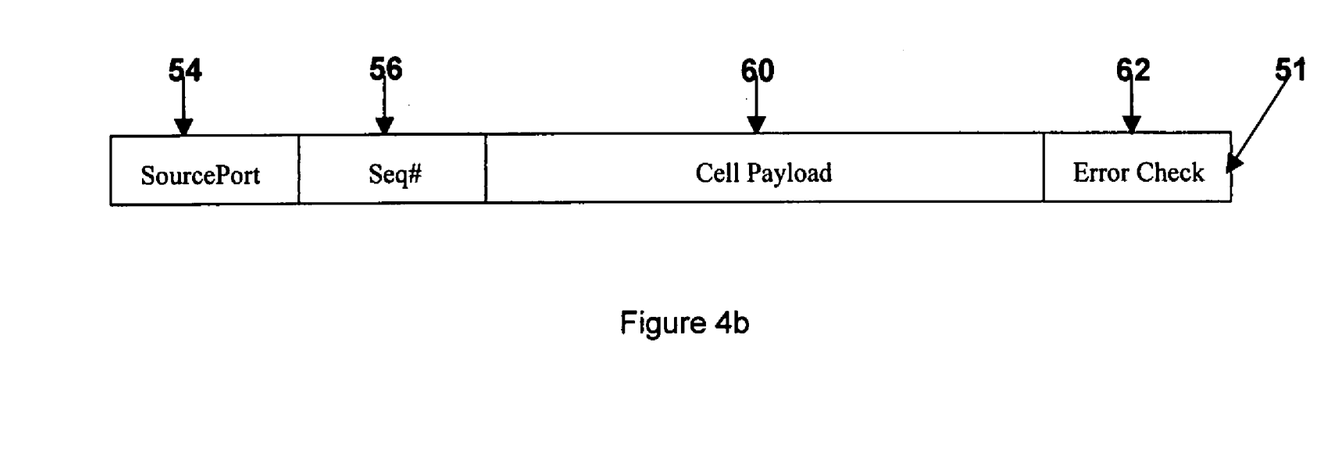

FIGS. 4a and 4b illustrate the formats of a data cell created from a data frame received at an input port 2. In the illustrated embodiment, a data cell payload 60 carries 64-bytes of frame header information added by the associated LUE 9 and/or the Ethernet frame data. The size of the data cell is determined from a desired payload size, cell header and cell trailer size. In the illustrated embodiments, this is accomplished in a 79-byte cell. Such cells carried on the links also include a one-byte "idle" separator to yield an 80-byte cell time. This embodiment provides non-blocking wire-rate forwarding for Ethernet frames when datapath 1 is twice the speed of data path 7, and path 7 is at least as fast as the aggregate data rate of the MAC devices connected to a switch fabric port. The input port 2 creates the cell header with sufficient information for frame reassembly at the destination output port 4. The input port 2 may use the address of the destination output port 4 to place the frame into the correct VOQ 14 (FIG. 3) corresponding with the destination output port 4 along with priority information included within the frame header.

The data cell 50 of FIG. 4a, having a destination port field 52, illustrates a format of a data cell 50 being transmitted from an input port 2 to a crossbar section 100 according to an embodiment. The physical link transmitting this cell inherently indicates the source-input port 2 to the receiving crossbar section 100. The receiving crossbar section 100 uses the destination port information 52 to place the cell into a correct output queue as discussed below with reference to FIG. 6. The receiving crossbar section saves information identifying the inherent source port when storing the cell in buffer 102. The data cell 51 of FIG. 4b, having a source port field 54 instead of a destination port field (determined from the physical link transmitting the data cell to the crossbar section 100), illustrates a format of a data cell 51 being transmitted from a crossbar section 100 to an output port 2. The receiving output port 4 uses the source port information 54 and the sequence number 56 to reassemble the frames. An error check field 62 is used by the crossbar 6 and the output port 4 to detect errors in the links into and out of the crossbar 6. All other routing data (e.g., VLAN and MAC addresses) may be included within the frame header created by the LUE 9 and transmitted to the input port on data path 7.

In the illustrated embodiment, each input port 2 maintains a sequence number 56 for each output port 4. The sequence number size is preferably significantly larger than the total number of cells that can be in transit through the crossbar 6 at any one time. This allows a moving window within the sequence number range to be used in error detection protocols. The sequence number 56 is incremented for each subsequent data cell forwarded to the fabric for the associated output port 4. The sequence number 56, therefore, indicates an ordinal position of the data cell among the data cells making up the partitioned data frame payload.

According to an embodiment, when the input port 2 begins forwarding a frame to an output port 4 (i.e., transmits an initial first data cell of the frame), the input port 2 completes transmission of the frame (i.e., transmission of all data cells having sequence numbers in the range of sequence numbers defining the data frame) even if input port 2 receives a higher priority frame having a destination associated with that output port 4. This ensures that the sequence numbers of a frame are contiguous, and that all priority queues to the output port 4 can use the same sequence number maintained for transmission of data cells from the input port 2 to the output port 4. It also simplifies reassembly by reducing the number of frames and cells that can arrive out of order.

Each output port 4 sorts forwarded data cells 51 based upon the field source port 54 and sequence number 56 (FIG. 4b). The sequence number 56 can be used to determine the ordinal position of the data payload of a forwarded data cell 51 within the data payload of the reconstructed frame. Algorithms known to those skilled in the art can then be used to recognize whether frames are complete, and determine whether there are any incomplete frames to be forwarded first (to be placed in a MAC transmission queue 22 (FIG. 3)). The output port 4 may use ASIC based reassembly buffers to support the receipt of data cells in the output buffer RAM 19 at the aggregate rate of the crossbar 6 through the links connected to the output port 4, or directly reassemble the frame in RAM 19. Either method benefits by decreasing the number of outstanding cells.

According to an embodiment, the VOQs 14 at the input ports 2 and MAC queues 22 at the output ports 4 may be adapted to support priority schemes. For example, the frame reassembler 18 and the MAC queuer 20 at the output ports 4 may implement priority schemes for meeting the requirements of the MAC protocol and IEEE Standard 802.1.

The output logic at the output port 4 may implement any one of several algorithms for determining the priority of frames to be transmitted to a particular MAC device. For example, the output port 4 may implement a MAC queue 22 with four priority levels where each frame is placed in a proper corresponding queue associated with one of the four priorities. Additional schemes may include round robin, pure priority and weighted access schemes. The output port 4 may implement a frame discard scheme to prevent MAC output starvation resulting from gross congestion conditions. Such a discard scheme may be selectable between random early discard (RED) and weighted random early discard (WRED). According to an embodiment, the size of the output buffer may be optimized based upon the particular data rate of physical links from the crossbar 6 and the number and data rate of MAC devices connected to the input ports 2 and the output port 4.

FIG. 5 shows an embodiment of the switching fabric including a set number of crossbar sections 100 which make up the crossbar 6. Input ports 2a through 2z have a communication link to each of the crossbar sections 100. Similarly, each of the output ports 4a through 4z have a communication link to each of the crossbar sections 100 of the crossbar 6. In the illustrated embodiment, each of the links coupling an input port 2 to a crossbar section 100 or coupling a crossbar section 100 to an output port 4 transmits data at a data rate (e.g., 16.0 Gps) which is twice that of the data being received at the input ports 2 (e.g., 8.0 Gbps).

Figure 6:
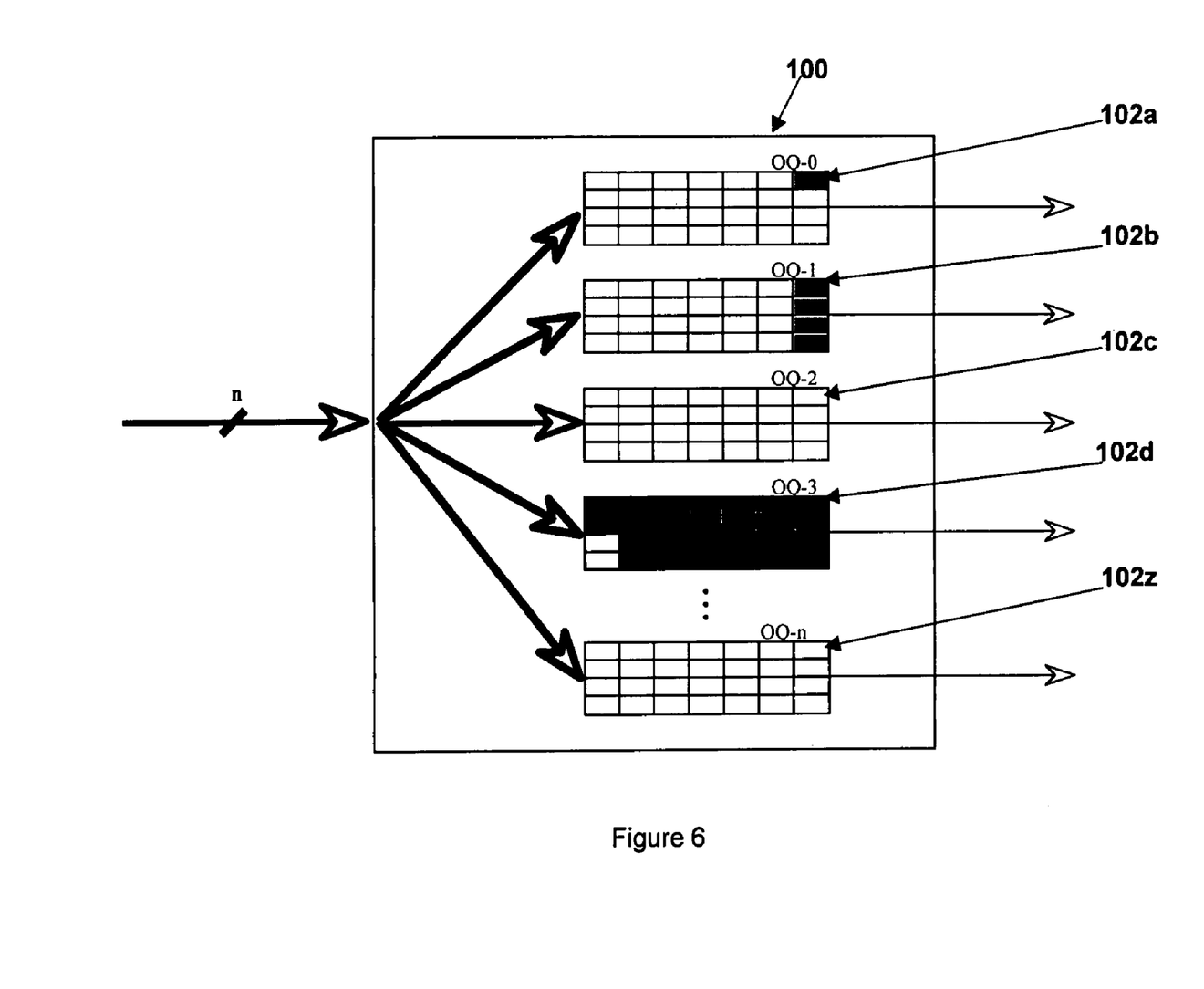
FIG. 6 illustrates an embodiment of a crossbar section of the switching fabric of FIG. 2 using cell buffers for maintaining a queue for each associated output port.

In the illustrated embodiment, each of the sections 100 of the crossbar 6 maintain one output queue per output port 4. These queues map one to one with the links to the output ports 4. Each input port 2 transmits data cells to the sections 100 of the crossbar independently to enable efficient operation and modular implementation. For example, the loss of a link connecting an input port 2 to a crossbar section 100 does not prevent the crossbar section 100 from being used by any other input port 2. Similarly, the loss of a crossbar section 100 does not prevent the load at the input ports 2 from being distributed among the remaining crossbar sections 100. FIG. 6 illustrates the outport queues 102 which are maintained in a representative crossbar section 100 of the crossbar 6 shown in FIG. 5. The crossbar section 100 maintains output queues 102a through 102z, each output queue 102 corresponding to one of the output ports 4.

Data cells are transmitted from the input ports 2 to the crossbar sections 100, and from the crossbar sections 100 to the output ports 4 at set cell intervals. On every cell interval, each input port 2 independently determines, for each link to a crossbar section 100, which VOQ 14, if any, is to be serviced. Accordingly, it is possible for all input ports 2 to simultaneously forward a data cell to the same output queue 102 in a crossbar section 100. Therefore, each output queue 102 in a crossbar section 100 preferably includes, at a minimum, capacity for one-cell per input port 2.

FIG. 6 shows the crossbar section 100 receiving data cells from each of the input ports 2. In the embodiment of FIG. 6, each of the output queues 102 can enqueue up to a set number of data cells. The number of cell buffers in each output queue 102 is preferably greater than the number of input ports 2. Otherwise, the output links to the output ports 4 may not be driven at a maximum rate. On the other hand, the frame reassembly logic at the output port 4 becomes increasingly complex as the number of cell locations in an output queue 102 increases. Therefore, the recommended number of cell locations per output queue 102 is greater than the number of input ports 2 but less than twice the number of input ports 2.

A data cell received on any of the input links from the input ports 2 may be written to any of the output queues 102. Logic at the receiving end of the crossbar section 100 may account for a delay sufficient to examine the header of the incoming data cells and determine the output queue 102 to enqueue the incoming data cell. Data cells waiting in the output queues 102 are subsequently transmitted to the corresponding link dedicated to the corresponding output port 4.

As discussed above, the input ports 2 partition the data payload of received frames into data cells as illustrated in the format shown in FIG. 4a. The output ports 4 receive the data cells to reconstruct the frame at frame reassembler 18 (FIG. 3). Data cells of any particular frame may be distributed among the different sections 100 of the crossbar 6 before being subsequently forwarded to the output port 4 associated with the destination of the frame. Because each input port 2 independently forwards data cells to the crossbar sections 100 to distribute its load among the crossbar sections 100, it is possible for load patterns to alter the order of the arrival of data cells arriving at the destination output port 4. This may occur in situations, for example, when the instantaneous load to one crossbar section 100 is larger than that for other crossbar sections 100.

Minimizing the number of cell buffers within each output queue 102 within each crossbar section 100 reduces the complexity of the frame reassembler 18. The frame reassembler 18 preferably provides sufficient cell buffering to maintain the data rate from the crossbar 6 into the output buffer RAM 19 without cell loss (e.g., if a frame discard need only be performed when MAC devices are congested, causing the output buffer RAM 19 to fill not because of the forwarding rate from the crossbar). If the data can be maintained only by writing pages or similar blocks of information to the output buffer RAM 19, then the reassembly implementation may accommodate the worst case of data cells 51 of particular frames arriving out of order.

According to an embodiment, frames arriving at any of the input ports 2 may be multi-cast frames which are to be broadcast among all or a subset of the output ports 4 and MAC queues 22. Here, the receiving input port 2 transmits a copy of the frame through the crossbar 6 for each destination output port 4. Each receiving output port 4 may then make additional copies for multiple MAC queues 22 associated with the receiving output port 4.

The data paths 7 into the switching fabric and data paths 5 out of the switching fabric service an aggregation of MAC addresses. This may create potential for the switching fabric to exhibit characteristics of blocking behavior for individual MAC ports. This happens if one MAC device is allowed to consume the entire output buffer 19 of its output port 4. This could result in other MAC devices on the output port 4 having their data rate restricted. This problem may be avoided if buffering is guaranteed for a particular MAC queue 22. This can be accomplished by using a frame discard protocol or reserving buffer space for each MAC queue 22 which are techniques known to those of ordinary skill in the art.

Figure 7:
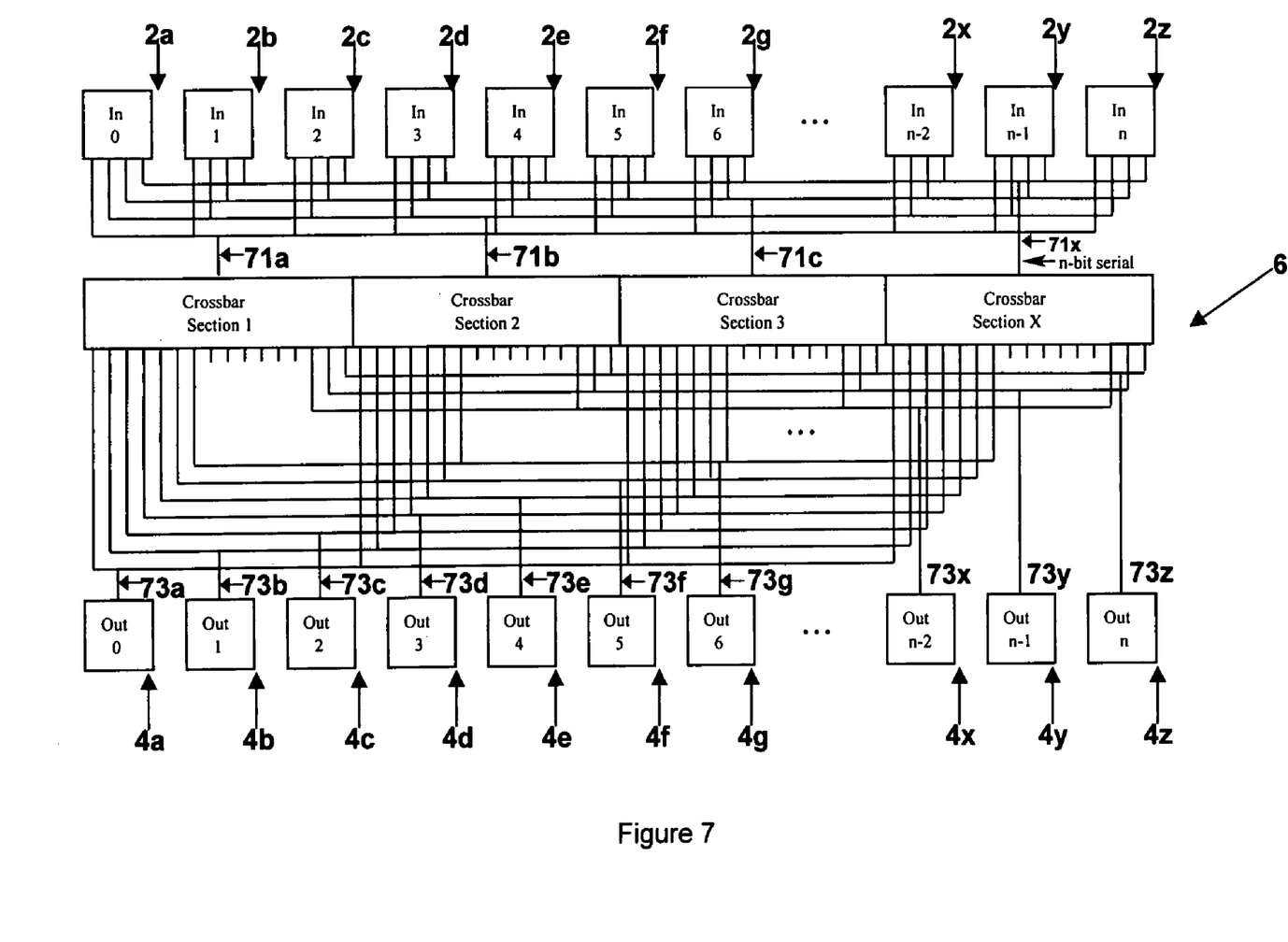
FIG. 7 illustrates the flow of control signals via data busses interconnecting elements of an embodiment of the switching fabric shown in FIG. 1.

The crossbar sections 100 transmit signals to the input ports 2 to indicate the ability of the crossbar section 100 to accept additional data cells. Each crossbar section 100 transmits a bit vector to each input port 2 at each cell interval, indicating the ability of the crossbar section 100 to receive a data cell at each of its output queues 102 in the following cell interval. The output ports 4 provide similar signaling to each of the crossbar sections 100. This provides capability to reduce congestion at the output ports 4 by controlling data being transmitted at the input ports 2. In each interval, each output port 4 transmits a signal to all of the crossbar sections 100 to indicate its ability to accept additional data cells in the following cell interval. The output port 4 does not signal that it is ready to receive additional data cells if there are insufficient buffers to receive a data cell from every crossbar section 100. FIG. 7 illustrates one embodiment for transmitting signals from each of the output ports 4 to the crossbar sections 100 indicating an availability to accept data cells from the crossbar sections using control busses 73, and transmitting the bit vector from each of the crossbar sections to each of the input ports 2 using control busses 71. In this embodiment control signals are transmitted directly on data busses from each output port 4 to each crossbar section 100, and from each crossbar section 100 to each input port 2.

In an alternative embodiment, the crossbar sections 100 and output ports 4 transmit such control signals in the forward data stream through the data links 3 and 5 (FIG. 2). Each of the output ports 4 may be coupled to its corresponding input port 2 control information received from the crossbar over data links 3 (equivalent to the control signals of control busses 71) or to provide control signals to output ports 4 (equivalent to the control signals of control busses 73) for transmission to the crossbar 100 over data links 1.

Each input port 2 may use each bit vector received from a crossbar section 100 to schedule a cell transfer on the data link between the crossbar section 100 and the input port 2 in the next cell interval. With each input port 2 being able to independently determine data cells which it forwards to a particular crossbar section 100, it is possible for all input ports 2 to simultaneously forward traffic to the same output queue 102 (of a crossbar section 100). Therefore, a crossbar section 100 preferably does not signal that it is ready to receive data at any particular output queue 102 unless it can receive at least one cell for that output queue 102 (corresponding to a particular output port 4) from every input port 2.

As discussed above, each input port 2 maintains at least one VOQ 14 for each output port 4 for data frames having a destination associated with the output port 4. One embodiment of the input port 2 maintains multiple (e.g., four) VOQs 14 for each output port 4, one VOQ 14 for each separate priority. When a unicast frame is received (on data path 7) at an input port 2, its header is examined to determine the output port 4 of the destination and the frame's priority. It is then placed in the appropriate VOQ 14 associated with the output port 4. Frames within a VOQ 14 may be serviced in a FIFO or other scheduling order known to those of ordinary skill in the art. A forwarding arbitration protocol of the input port 2 determines the order in which VOQs 14 are serviced. The procedure of the illustrated embodiment ensures that frames enter the crossbar 6 meeting the ordering requirement of the IEEE standard 802.1. When a multicast frame is received at the input port 2, its header is examined to determine the destination output ports 4. The frame can then be placed in the VOQ 14 of an appropriate priority for each destination output port 4.

Each input port 2 examines the frame header of each received data frame to determine if the frame should be filtered or forwarded. If the frame is to be forwarded, the input port 2 may also copy the data frame for transmission to multiple output ports 4 (e.g., where a multicast frame is copied to each output). Frames to be forwarded to an output port 4 are placed in a VOQ 14 of the output port 4 corresponding to the frame priority.

Use of the mesh interconnection input ports 2 to the independent crossbar sections 100 of the crossbar 6 achieves its desired increase speed from S to two times S (e.g., 8.0 Gbps to 16.0 Gbps) by fully utilizing the data links 1 from the input ports 2 to the crossbar sections 100. Each of the data links 1 (e.g., data link 1z) from any input port 2 may transfer a data cell from the same frame, each from a different frame or any combination thereof. The application of a priority scheme, therefore, may be performed on a per frame basis to prevent deadlock and reduce the complexity of the frame reassemblers 18. Once initiated, preference may be given to completing a partially transmitted frame rather than starting a new frame. The transmission of data cells for subsequent new data frames may be scheduled for the VOQs 14 of other output ports 4 in a round robin order. This prevents a partially transmitted frame from blocking a frame destined for a different output port 4. The frame selector 16 at the input port 2 may determine whether to forward a data cell in the VOQ 14 to a crossbar section 100 based upon the status of the first data frame in the VOQ 14 (i.e., whether any data cells have been transmitted to the cross bar 6) of a particular output port 4 and the readiness of the crossbar section 100 (i.e., from the bit vector). Once transfer of a frame has been initiated, the input port 2 preferably does not start forwarding data cells of any other frames for the target output port 4 until all data cells of the frame are, or are being, transferred into the crossbar 6. The single frame per output port 4 processing simplifies the reassembly processes at the output port 4.

Figure 8:
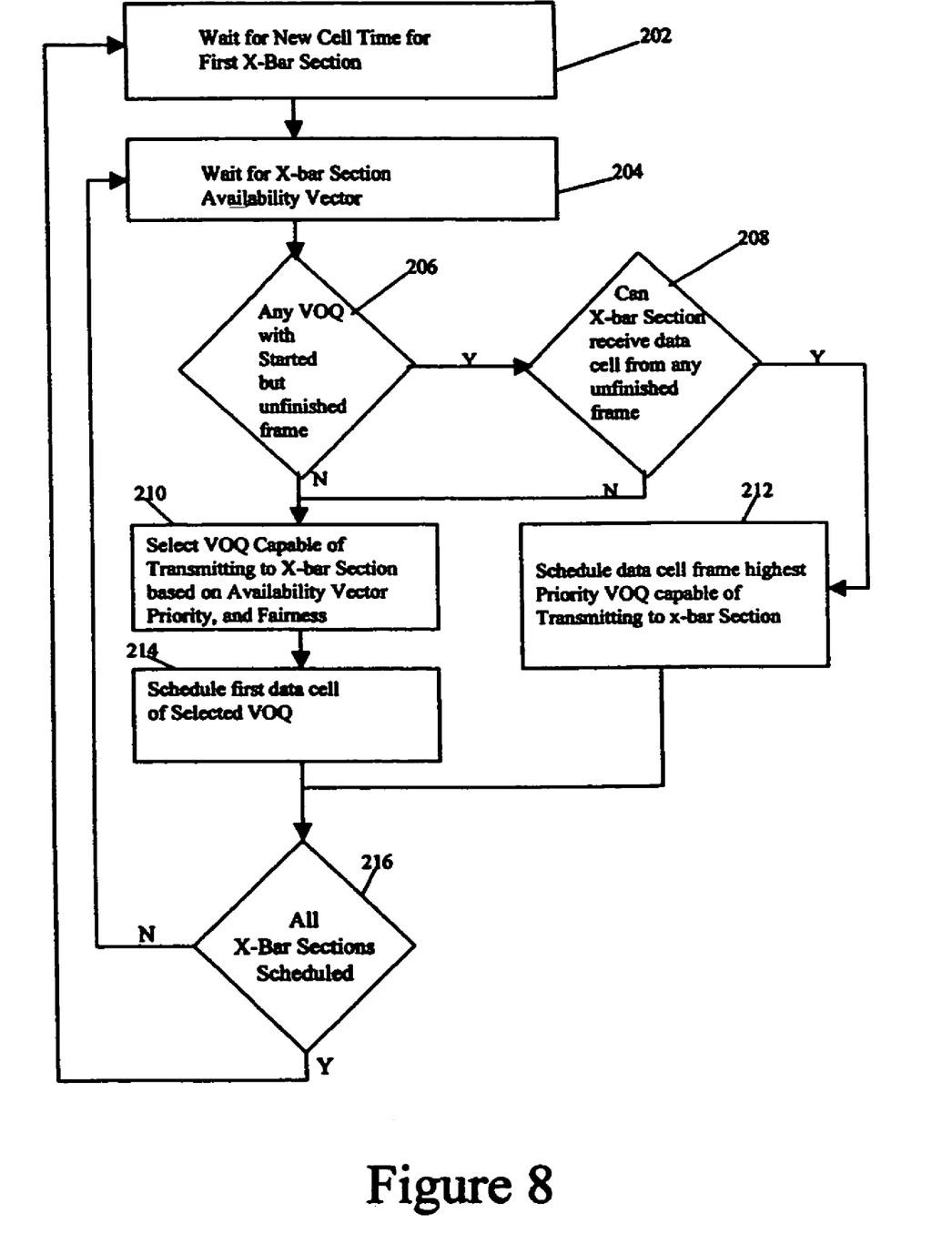
FIG. 8 illustrates logic at the input ports for scheduling the transmission of data cells to crossbar sections.

FIG. 8 shows a functional flow diagram illustrating logic executed in the frame selector 16 of an embodiment of the input port 2. The selection may be performed sequentially for each crossbar section 100 and repeated for each cell time. At step 202, the input port 2 corresponding to the frame selector 16 waits for the start of a new cell time for the first crossbar section (e.g., crossbar section 100a). In step 204, the selector frame 16 receives a bit vector from the current crossbar section 100 indicating the ability of the crossbar section 100 to receive data cells for transmission to particular output ports 4. At steps 204 through 216, the frame selector 16 schedules the transmission of data cells on each of the data links 1 connecting the input port 2 to the crossbar sections 100. Step 206 determines whether there are any partially transmitted data frames in any of the VOQs 14. If there are any such partially transmitted data frames, step 208 determines whether the crossbar section 100 can receive a data cell from any of the partially transmitted data frames. That is, based upon the output ports 4 associated with the destinations of the partially transmitted data frames, step 208 determines whether the crossbar section 100 can receive any data cells for these destinations based upon the bit vector of the crossbar section 100 received at step 202. If the crossbar section 100 can receive a data cell from any of the partially transmitted data frames, step 212 schedules a data cell from a partially transmitted data frame having the highest precedence.

If there are no partially transmitted frames to be transmitted to the crossbar section as determined at steps 206 and 208, step 210 selects a VOQ 14 associated with an output port 4 capable of transmitting to the crossbar section based upon the bit vector received at step 204 having the highest priority and maintaining fairness within the priority. Step 214 then schedules the first data cell of the first data frame (i.e., the highest priority) of the VOQ 14 associated with an output port 4. If no cell can be scheduled at step 214, an empty cell may be transmitted. When the frame selector 16 has scheduled a transmission of a data cell on each of the data links 3 coupled to a crossbar section 100 as determined by step 216, step 202 awaits a new cell transfer interval.

As pointed out above, several different types of priority algorithms can be employed at either the input ports 2 or the output ports 4. The input ports 2 may use priority schemes to arbitrate how frames having destinations associated with the same output port 4 are to be scheduled for transmission to the crossbar 6 on the data links 3. The input ports 2 may also use priority schemes to arbitrate the scheduling of data cells from among VOQs 14 of data frames having destinations associated with different output ports 4. Priority schemes at the input ports 1 may include round robin, pure priority, weighted priority or weighted access. The output ports 4 may use priority schemes in selecting which reassembled frames are to be forwarded to the MAC devices from the MAC queues 22. Congestion at a single output MAC address can cause starvation of other MAC addresses of the output port 4 when the buffer is not available to forward cells from the crossbar 6 to an uncongested MAC address. This condition may be prevented by enabling one of many possible output port discard protocols including random early discard (RED), weighted random early discard (WRED) and tail drop.

Priority algorithms may be uniform for the frame selector 16 of each of the input ports 2 and the MAC queues 20 of each of the output ports 4. However, the illustrated embodiments enable the hardware to independently specify a priority scheme for each input port 2 and each output port 4 since each input port 2 and output port 4 may be a separate integrated circuit. At an input port 2, the frame selector 16 may apply priorities for the data frames within each VOQ 14. In the output ports 4, the priority schemes are applied by the MAC queuer 20 to each of the MAC queues 22.

The architecture of the switching fabric illustrated in FIG. 5 provides additional advantages of modularity and scalability. First, each pair of an input port 2 and output port 4 (i.e., input port 2 and output port 4 coupled to the same MAC device) and crossbar sections 100 can operate independently as each of these components can be formed in a separate integrated circuit package. The entire switching fabric may then be enclosed within a chassis or distributed over a stack of chassis. Second, the topology of the switching fabric can be scaled to implement several fabric sizes. In other embodiments, the topology may reside on a single board, or single board plus daughter board implementation. The switch fabric performance may be determined from the port/link speed, and the topology may be scaled using a different number of crossbar sections 100 and ports as illustrated in the examples of Table 1 below.

TABLE 1

| NUMBER OF CROSSBAR SECTIONS | LINK SPEED (Gbps) | NUMBER OF PORT PAIRS | BANDWIDTH (Gbps) | THROUGH-PUT (Gbps) |
| --- | --- | --- | --- | --- |
| 8 | 2 | 48 | 1536 | 384 |
|   | 1 | 26 | 416 | 104 |
| 4 | 2 | 24 | 768 | 192 |
|   | 1 | 13 | 208 | 52 |
| 2 | 2 | 12 | 384 | 96 |
|   | 1 | 6.5 | 104 | 26 |
| 1 | 2 | 6 | 192 | 48 |
|   | 1 | 3.25 | 52 | 13 |
| 0 | 2 | 1 | 32 | 8 |
|   | 1 | 1 | 8 | 4 |

When the crossbar 6 is scaled to smaller sizes, each crossbar section 100 receives two, four or eight links from each input port. Each of these links corresponds with a different cell phase relationship. Flow control signaling may be maintained by having each crossbar section 100 transmit multiple flow control vectors to accurately report the availability of output queues 102 (FIG. 6). Alternatively, each crossbar section 100 may maintain additional output queues 102. The later method can be implemented by ignoring the additional output queues 102 for reporting availability (e.g., only reporting the ability to receive twenty-six cells when there are actually thirty-three cell locations empty).

In alternative embodiments, the switching fabric includes counters at the input ports 2, output ports 4 and the crossbar sections 100 to support common management protocols. Control registers support the reporting of counts in specially addressed cells which are transmitted to specific MAC addresses coupled to selected output ports 4. In other embodiments, a microprocessor interacts with one or more of the components of the switching fabric to receive count information directly.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A switching fabric to transmit received data frames to destinations, each received data frame to specify a destination, the switching fabric comprising:

a plurality of input ports, each input port to include a data frame queue associated with the specified destination in each received data frame each input port to partition each received data frame into data cells, the input port to queue the data cells in the data frame queue associated with the specified destination;

a plurality of crossbar sections, each crossbar section coupled to each input port to receive the data cells at cell transfer intervals on a data link coupled between each input port and each crossbar section, each crossbar section to include a destination queue associated with the specified destination in each received data frame; and a plurality of output ports, each output port to receive data cells from the crossbar section on a data link between each crossbar section and each output port;

wherein each input port includes logic to schedule the transmission of each data cell of a received data frame to any output port associated with the specified destination, the schedule based upon a crossbar section indicating an ability to receive a data cell at a destination queue associated with the specified destination at a subsequent cell transfer interval.

2. The switching fabric of claim 1, wherein each received data frame includes a data payload and one or more data cells partitioned from each received data frame to include a portion of the data payload, the one or more data cells collectively to include the data payload of each respective received data frame.

3. The switching fabric of claim 1, wherein the destination queue associated with the specified destination in each received data frame comprises a finite number of locations, each location to receive a single data cell from an input port, and wherein the ability of the crossbar section to receive the data cell at the destination queue associated with the specified destination is based upon a quantity of locations available in the destination queue associated with the specified destination at the subsequent cell transfer interval.

4. The switching fabric of claim 1, wherein the destination specified in a received data frame comprises one or more media access control (MAC) devices coupled to each output port through a common transmission medium, each output port includes one or more MAC queues associated with the one or more MAC devices, the one or more MAC queues to receive reassembled data frames that specify the one or more MAC devices as the destination.

5. The switching fabric of claim 4, wherein each output port is to transmit a signal to each crossbar section to indicate an ability to receive data cells on the data link between each output port and each crossbar section.

6. The switching fabric of claim 1, wherein each crossbar section is to transmit a signal to each input port to indicate the ability to receive the data cell at the destination queue associated with the specified destination at the subsequent cell transfer interval.

7. A method of transmitting digital data from a plurality of sources to a plurality of destinations, the method comprising:

receiving a data frame specifying a destination at an input port from among a plurality of input ports, the input port to include a data frame queue associated with the specified destination;

partitioning portions of the received data frame to provide data cells;

queuing the data cells in the data frame queue;

scheduling, at the input port, a transmission of each data cell of the received data frame to any one of a plurality of crossbar sections, each crossbar section including a destination queue associated with the specified destination, wherein the transmission is to occur during a cell transfer interval over one or more data links between the input port and each crossbar section, the scheduling based on each crossbar section indicating an ability to receive each data cell at the destination queue associated with the specified destination at the cell transfer interval;

transmitting each data cell to the crossbar section based on the schedule;

receiving each data cell at the destination queue included in the crossbar section, wherein the crossbar section is to transmit each data cell over a data link to an output port from among a plurality of output ports.

8. The method of claim 7, wherein the data frame includes a data payload, and each data cell of the received data frame to include a portion of the data payload of the received data frame, the data cells collectively to include the data payload of the received data frame.

9. The method of claim 8, the method further comprising scheduling the transmission of each data cell of the received data frame prior to scheduling a transmission of a data cell of another subsequent received data frame specifying a same destination.

10. The method of claim 9, the method further comprising, the data links coupled between the input port and each crossbar section attempting to schedule a transmission of a data cell of a partially transmitted data frame, the partially transmitted data frame having at least one associated data cell previously scheduled for transmission to a crossbar section prior to scheduling another transmission of a data cell of a data frame for which no data cells have been previously scheduled for transmission to the crossbar section.

11. The method of claim 7, wherein the destination queue is capable of queuing a finite number of data cells at any one time, the method further including determining the ability of the destination queue to receive each data cell of the received data frame based upon a quantity of locations available in the destination queue at the cell transfer interval, each location capable of receiving a single data cell.

12. The method of claim 7, the method further comprising, at the output port, maintaining a media access control (MAC) queue of reassembled data frames to be transmitted to one or more MAC devices through a common transmission medium, the destination of each reassembled data frame in the MAC queue being associated with the one or more MAC devices.

13. The method of claim 7, the method further comprising the output port associated with the specified destination transmitting a signal to the crossbar section indicating an ability to receive each data cell over the data link between the output port and the crossbar section at a subsequent cell transfer interval and the crossbar section transmitting each data cell to the output port based on the signal.

14. The method of claim 7, the method further comprising transmitting a signal from the crossbar section to the input port to indicate the ability to receive a data cell at the destination queue at a subsequent cell transfer interval.

15. A switch fabric in a data communication network including a plurality of host computers for transmitting data packets to a plurality of destinations, each destination being associated with a media access control (MAC) device having a MAC address, the switching fabric comprising:

a plurality of output ports, each output port to couple to at least an associated one of the MAC devices to transmit MAC data frames to the MAC device according to the MAC address associated therewith;

a look-up engine to receive the data packets from the host computers and to form intermediate data frames based upon the data packets, the intermediate data frames to have information to identify an output port associated with one of the destinations of the MAC device in a header and a data payload;

a plurality of input ports to receive the intermediate data frames from the lookup engine, each input port to include a data frame queue associated with the identified output port, each input port to partition the received intermediate data frames to provide a plurality of data cells; and a plurality of crossbar sections, each crossbar section to receive the data cells at cell transfer intervals on a data link coupled between each input port and each crossbar section, each crossbar section to transmit the data cells to any one of the plurality of output ports, each crossbar section to include a destination queue associated with each of the plurality of output ports, wherein each input port includes logic to schedule the transmission of each data cell of a received intermediate data frame to any crossbar section, based upon a crossbar section indicating an ability to receive a data cell at a destination queue at a subsequent cell transfer interval.

16. The switch fabric of claim 15, wherein each received intermediate data frame includes a data payload and one or more partitioned data cells from each received intermediate data frame to include a portion of the data payload, the one or more associated data cells collectively having the data payload of each respective received intermediate data frame.

17. The switch fabric of claim 16, wherein each input port is to schedule the transmission of the one or more associated data cells to the crossbar section on the data link coupled between each input port and the crossbar section prior to scheduling a transmission of a data cell of another received intermediate data frame, the other received intermediate data frame received subsequently and queued in the same data frame queue associated with the same output port.

18. The switch fabric of claim 16, wherein for each data link coupled between each input port and each crossbar section, each input port is to attempt to schedule a data cell of a partially transmitted data frame, the partially transmitted data frame having at least one associated data cell previously scheduled for transmission to a crossbar section, prior to scheduling a transmission of a data cell of a data frame for which no data cells have been previously scheduled for transmission to the crossbar section.

19. The switch fabric of claim 15, wherein the destination queue is capable of queuing a finite number of data cells at any one time, and wherein the ability of each crossbar section to receive the data cells of the received intermediate data frames with a destination associated with the output port is based upon a quantity of locations available in the destination queue at the subsequent cell transfer interval, each location capable of receiving a single data cell from an input port.

20. The switch fabric of claim 15, wherein each output port includes logic to reassemble the received intermediate data frames specifying a destination associated with each output port from data cells received from each crossbar section coupled to each output port.

21. The switch fabric of claim 20, wherein each output port is coupled to each MAC device associated with each output port through a common transmission medium and wherein each output port is to maintain a MAC queue of reassembled data frames for transmission to the associated MAC devices, the destination of each reassembled data frame in the MAC queue being associated with the MAC device.

22. The switch fabric of claim 21, wherein each output port is to transmit a signal to each crossbar section indicating an ability to receive data cells from data links coupling each output port to each crossbar section.

23. The switch fabric of claim 15, wherein each crossbar section is to transmit a signal to each input port to indicate the ability to receive a data cell at a destination queue at a subsequent cell transfer interval.

* * * * *